United States Patent Office 2,992,158
Patented July 11, 1961

2,992,158
DIALKYL CYANOBENZYL PHOSPHOROTHIOATES
Gerald Berkelhammer, Norwalk, and Frank A. Wagner, Jr., New Haven, Conn., assignors to American Cyanamid Company, New York, N.Y., a corporation of Maine
No Drawing. Filed May 31, 1960, Ser. No. 32,584
14 Claims. (Cl. 167—30)

The present invention relates to novel pesticidal thiophosphorous compounds, novel methods for their preparation and novel pesticidal compositions. More particularly, the invention relates to cyanobenzyl derivatives of phosphorothioates and phosphorodithioates having the general formula:

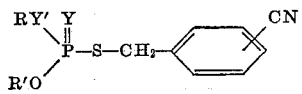

wherein R and R' are lower alkyl radicals of from 1 to 4 carbon atoms and Y and Y' are selected from the group consisting of oxygen and sulfur, where Y and Y' as well as R and R' may be the same or dissimilar.

The new class of compounds as contemplated include such compounds as, for instance:

O,O-dimethyl S-o-cyanobenzyl phosphorodithioate
O,O-diethyl S-p-cyanobenzyl phosphoro dithioate
O,O-dipropyl S-o-cyanobenzyl phosphorodithioate
O,O-diisopropyl S-o-cyanobenzyl phosphorodithioate
O-methyl O-ethyl S-o-cyanobenzyl phosphorodithioate
O-methyl O-propyl S-o-cyanobenzyl phosphorodithioate
O-ethyl O-isopropyl S-o-cyanobenzyl phosphorodithioate
O,O-dimethyl S-p-cyanobenzyl phosphorothioate
O,O-diethyl S-o-cyanobenzyl phosphorothioate
O,O-dipropyl S-p-cyanobenzyl phosphorothioate
O,O-diisopropyl S-p-cyanobenzyl phosphorothioate
O-methyl S-methyl S-p-cyanobenzyl phosphorodithioate
O-methyl S-ethyl S-m-cyanobenzyl phosphorodithioate
O-ethyl S-propyl S-m-cyanobenzyl phosphorodithioate and the like; and compounds which are homologs and isomers of those set out above and in which the cyano group may be in either the ortho, the meta or the para position as hereinabove defined.

The novel compounds of the present invention are prepared by reacting a cyanobenzyl halide in any of its isomeric forms with an alkali metal salt of an O,O-dialkyl thiophosphate or an O,O-dialkyl dithiophosphate. Cyanobenzyl halides, such as o-, m-, or p-cyanobenzyl chloride or p-cyanobenzyl bromide, may be employed. Illustrative dialkyl thiophosphates and dialkyl dithiophosphates in the form of their alkali metal salts which can be reacted with a cyanobenzyl halide include, for instance, the sodium or potassium salt of: O,O-dimethyl thiophosphate, O,O-dimethyl dithiophosphate, O,O-dipropyl thiophosphate, O,O-dipropyl dithiophosphate, O,O-diisopropyl thiophosphate, O,O-diisopropyl dithiophosphate, O-methyl O-ethyl dithiophosphate, O-methyl O-isopropyl dithiophosphate, O-methyl S-ethyl dithiophosphate, and O-methyl S-methyl dithiophosphate.

Advantageously, the amounts of reactants required for preparing the new class of compounds are not critical. Although a mol excess of one reagent or the other may be employed, it is preferred that the reactants be employed in stoichiometric amounts. The novel compounds of the present invention are generally prepared in the presence of an inert organic solvent. Such solvents include acetone, methyl isobutyl ketone, ether, ethyl alcohol, carbon tetrachloride, benzene and the like.

In general, the reaction can be carried out within a wide temperature range extending from the freezing point to the decomposition temperature of the reaction mixture. However, it is preferred that the reaction be carried out at temperatures from about 20° C. to 150° C.

The novel compounds of this invention find utility as insecticides, acaricides and nematocides. When employing any of the compounds of the present invention for use as an insecticide, acaricide or a nematocide, they are generally used with a carrier. The carrier can be liquid or solid. Accordingly, the new compounds can be employed as powders or solutions. For example, any of the novel compounds can be diluted with a compatible solvent which is commercially employed in pesticide formulations and used as insecticidal sprays after emulsification in water using an appropriate emulsifying agent. Also, if desired, the compounds can be used in dust formulations by dilution with an inert diluent such as, for example, talc, kaolinite, clay or other solid diluent. Furthermore, the compounds can also be sprayed onto a granular carrier of the type generally used in pesticide formulations. In addition, the new compounds of this invention can be diluted with commercially available propellants and used as aerosols.

The following examples are illustrative of the preferred embodiments of the invention. They are not deemed to be limited thereto. All parts and percentages are by weight unless otherwise stated.

EXAMPLE 1

O,O-diethyl S-o-cyanobenzyl phosphorodithioate

In a suitable reaction vessel are added and dissolved 7.6 parts of o-cyanobenzyl chloride (0.05 mol) in about 60 parts (by volume) of anhydrous acetone containing 11.2 parts of potassium O,O-diethyl dithiophosphate (0.05 mol) in anhydrous acetone. The total solution volume is adjusted to 200 parts, the mixture refluxed for 30 minutes and stirred at room temperature for 6 hours and 40 minutes. The solids are filtered and the solvent removed from the filtrate under reduced pressure, yielding 14.8 parts of a light green oil. The oil is taken up in chloroform and washed with water. The chloroform solution is dried over magnesium sulfate and the solvent removed under reduced pressure, yielding 13.4 parts of a pale green oil. The oil crystallizes upon storing overnight at 0° C. Recrystallization from ether-petroleum ether in an ice-methanol bath yields 84% of theory of the light tan crystalline product, M.P. 38° C.–39.0° C.

EXAMPLE 2

O,O-dimethyl S-o-cyanobenzyl phosphorodithioate

To a suitable reaction vessel containing 64 parts o-cyanobenzyl chloride (0.04 mol) in 50 parts of anhydrous acetone are added 8.3 parts potassium O,O-dimethyl dithiophosphate (0.04 mol) in 150 parts of anhydrous acetone. The mixture is refluxed for 30 minutes and allowed to stand overnight at room temperature. The solids are filtered off and the solvent removed from the filtrate under reduced pressure, yielding 11.0 parts of a cloudy pale green oil. The oil is taken up in 100 parts of chloroform and washed with water. The chloroform solution is dried over magnesium sulfate and the solvent removed under reduced pressure. Chromatographic purification of the resulting oil yields a colorless oil which crystallizes with difficulty at Dry Ice-acetone bath temperature. Repeated recrystallizations from ether-petroleum ether and toluene-petroleum ether yield the pure product as a white crystalline solid, M.P. 36° C.–36.3° C.

EXAMPLE 3

*O,O-dimethyl S-p-cyanobenzyl phosphorodithioate*

Into a suitable reaction vessel are added 2 parts of potassium O,O-dimethyl dithiophosphate (0.01 mol) dissolved in 35 parts of acetone and 1.5 parts of p-cyanobenzyl chloride (0.01 mol) in 15 parts of acetone is stirred into the solution. The mixture is heated to reflux for one hour, cooled to room temperature and filtered. Solvent is removed from the filtrate, the resulting oil taken up in chloroform and washed with water. The chloroform solution is dried over magnesium sulfate and evaporated under reduced pressure, yielding 77% of an oil which solidifies upon cooling. Recrystallization from ether-petroleum ether yields 34% of product, having a melting point of 63° C.–64° C.

EXAMPLE 4

*O,O-diethyl S-p-cyanobenzyl phosphorodithioate*

The procedure of Example 3 is repeated using 2.2 parts of potassium O,O-diethyl dithiophosphate (0.01 mol). After the usual work-up, 2.3 parts of an oil is obtained which crystallizes upon standing at 0° C. overnight. Recrystallizations from petroleum ether result in 33% yields of a white crystalline product of melting point 33° C.–33.5° C.

EXAMPLE 5

*O,O-dimethyl S-p-cyanobenzyl phosphorothioate*

The procedure of Example 3 is repeated substituting 1.8 parts of potassium O,O-dimethyl thiophosphate (0.01 mol) for potassium O,O-dimethyl dithiophosphate. After refluxing for 90 minutes, the mixture is cooled, filtered and distilled under vacuo to obtain 2 parts of an oil which crystallizes upon cooling. Recrystallization yields 35% of the pure product, melting point 54° C.–55° C.

EXAMPLE 6

*O,O-dimethyl S-m-cyanobenzyl phosphorodithioate*

To a solution of 3.3 parts of potassium O,O-dimethyl dithiophosphate (0.017 mol) in 25 parts of acetone are added 2.6 parts of m-cyanobenzyl chloride (0.017 mol) in 25 parts of acetone. The mixture is refluxed for one hour, cooled and filtered. The filtrate is distilled under reduced pressure yielding 82% of a light brown oil. Chromatographic purification of the oil gives the pure product as a colorless oil, $n_D^{25}$=1.5863, yield=22%.

EXAMPLE 7

*O,S-dimethyl S-p-cyanobenzyl phosphorodithioate*

Into a suitable reaction vessel containing a solution of 1.5 parts of p-cyanobenzyl chloride (0.01 mol) are added 2 parts of potassium O,S-dimethyl dithiophosphate in 40 parts of methyl ethyl ketone and heated under reflux for one hour. The mixture when cooled and filtered to remove solids is vacuum distilled to yield a straw-colored oil in 73% yield.

EXAMPLE 8

The compounds prepared in the foregoing examples are each mixed in a solution containing 65% acetone and 35% water and their insecticidal activity tested by spraying nasturtium aphids. The test data is recorded below in the following table.

TABLE I

| Example | Compound | Percent Kill of Aphids Concentration (in percent) | | |
|---|---|---|---|---|
| | | 0.1 | 0.01 | 0.001 |
| 1 | (C₂H₅O)₂P(S)—SCH₂—C₆H₄—CN | 100 | 100 | 100 |
| 2 | (CH₃O)₂P(S)—SCH₂—C₆H₄—CN | 100 | 100 | 100 |
| 3 | (CH₃O)₂P(S)—SCH₂—C₆H₄—CN | 100 | 90 | |
| 4 | (C₂H₅O)₂P(S)—SCH₂—C₆H₄—CN | 100 | 98 | |
| 5 | (CH₃O)₂P(O)—SCH₂—C₆H₄—CN | 100 | 100 | |
| 6 | (CH₃O)₂P(S)—SCH₂—C₆H₄—CN | 100 | 98 | |
| 7 | (CH₃O)(CH₃S)P(S)—S—CH₂—C₆H₄—CN | 100 | 95 | |

We claim:

1. A compound of the structure:

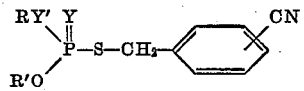

wherein R and R′ are lower alkyl and Y and Y′ are selected from the group consisting of oxygen and sulfur.

2. O,O-diethyl S-o-cyanobenzyl phosphorodithioate.
3. O,O-dimethyl S-o-cyanobenzyl phosphorodithioate.
4. O,O-dimethyl S-p-cyanobenzyl phosphorodithioate.
5. O,O-diethyl S-p-cyanobenzyl phosphorodithioate.
6. O,O-dimethyl S-p-cyanobenzyl phosphorothioate.

7. A process for preparing a novel compound represented by the structure:

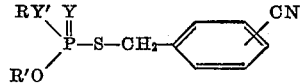

wherein R and R′ are lower alkyl and Y and Y′ are selected from the group consisting of oxygen and sulfur comprising: reacting a cyanobenzyl halide with a salt reactant selected from the group consisting of an alkali metal salt of a lower O,O- or O,S-dialkyl dithiophosphate and an alkali metal salt of a lower dialkyl thiophosphate, in an inert organic solvent; and, thereafter, recovering the thus-formed reaction product.

8. The process according to claim 7 for preparing a compound of the structure:

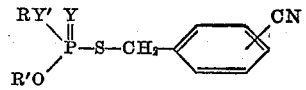

wherein R and R′ are lower alkyl and Y and Y′ are selected from the group consisting of oxygen and sulfur comprising: mixing a cyanobenzyl chloride with a salt selected from the group consisting of an alkali metal salt of a lower dialkyl dithiophosphate and an alkali metal salt of a lower dialkyl thiophosphate, subjecting the mixture to temperatures of from about 0° C. to about 100° C.; and recovering the thus-formed reaction product.

9. An insecticidal composition comprising a minor amount of compound having the formula:

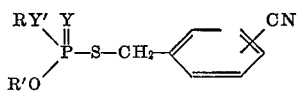

wherein R and R' are lower alkyl, and Y and Y' are each selected from the group consisting of oxygen and sulfur and a major amount of inert carrier therefor.

10. An insecticidal composition according to claim 9 in which the compound is O,O-diethyl S-o-cyanobenzyl phosphorodithioate.

11. An insecticidal composition according to claim 9 in which the compound is O,O-dimethyl S-o-cyanobenzyl phosphorodithioate.

12. An insecticidal composition according to claim 9 in which the compound is O,O-dimethyl S-p-cyanobenzyl phosphorodithioate.

13. An insecticidal composition according to claim 9 in which the compound is O,O-diethyl S-p-cyanobenzyl phosphorodithioate.

14. An insecticidal composition according to claim 9 in which the compound is O,O-dimethyl S-p-cyanobenzyl phosphorothioate.

No references cited.